United States Patent
Forget et al.

(10) Patent No.: US 6,490,621 B1
(45) Date of Patent: Dec. 3, 2002

(54) CALCULATION OF RESOURCE AVAILABILITY USING DEGRADATION FACTORS

(75) Inventors: Leo Forget, Stittsville (CA); Omid Afnan, Ottawa (CA)

(73) Assignee: Orchestream Americas Corporation, Kanata (CA)

(*) Notice: Subject to any disclaimer, the term of this patent is extended or adjusted under 35 U.S.C. 154(b) by 0 days.

(21) Appl. No.: 09/440,932

(22) Filed: Nov. 16, 1999

Related U.S. Application Data

(60) Provisional application No. 60/110,466, filed on Nov. 30, 1998.

(30) Foreign Application Priority Data

Nov. 20, 1998 (CA) .............................................. 2254285

(51) Int. Cl.⁷ ............................................. G06F 13/00
(52) U.S. Cl. ...................................................... 709/224
(58) Field of Search ................................. 709/200, 201, 709/220, 223, 224, 225, 226

(56) References Cited

U.S. PATENT DOCUMENTS

| | | | | |
|---|---|---|---|---|
| 5,408,475 A | * | 4/1995 | Lee | 714/715 |
| 5,598,404 A | * | 1/1997 | Hayashi et al. | 370/342 |
| 5,956,683 A | * | 9/1999 | Jacobs et al. | 704/270.1 |

* cited by examiner

Primary Examiner—Moustafa M. Meky
(74) Attorney, Agent, or Firm—Marks & Clerk

(57) ABSTRACT

In a method of determining the availability of a network resource in a digital communications network, atomic resources that are not composed of other resources are first identified. A degradation factor is assigned to each atomic resource. Subsequently a degradation factor for a composite resource is derived from the degradation factors of the atomic resources in accordance with a predetermined relationship.

4 Claims, 2 Drawing Sheets

CALCULATION OF RESOURCE AVAILABILITY USING DEGRADATION FACTORS

This application claims the benefit of provisional application No. 60/110,466, filed Nov. 30, 1998.

This invention relates to the field of network management, and in particular a method of determining resource availability in a digital communications network.

The calculation of availability for resources in a network is often based on a simple binary state (i.e. available or unavailable). Subsequently, calculations of availability for a set of inter-related resources are limited to an overall binary state as well. In the case of certain combinations of resources, the unavailability of one resource does not result in a simple state for the aggregate of resources. For example, one branch of a set of parallel resources being unavailable does not mean that the whole set is either available or unavailable.

An object of the invention is to alleviate this problem.

According to the present invention there is provided a method of determining the availability of a network resource in a digital communications network, comprising the steps of identifying atomic resources that are not composed of other resources, assigning a degradation factor to each atomic resource, and subsequently deriving a degradation factor for a composite resource from the degradation factors of the atomic resources in accordance with a predetermined relationship.

The calculation of availability using the concept of degradation requires the assignment of a degradation factor to each atomic resource. Atomic resources are ones that are not composed of any other resources. Atomic resources are combined into composite resources that also have a degradation factor. The degradation factor for the composite resource is derived from some formula applied to all the component (atomic) resources. The degradation factor itself is a preferably real value between zero (0) and one (1) inclusive. A zero value indicates full degradation while 1 indicates full availability.

Atomic resources can be combined using certain basic relationships. These are outlined below:

Serial Relationships

The "child" resources contained within a serial composite resource must always be specified in a specific order.

The degradation factor of the serial resource is always equivalent to the lowest degradation factor from its child resources. This can be represented by the following:

degradation factor=min (select all degradation factors from child resources)

Parallel Relationships

The "child" resources within a parallel composite resource are not specified in any specific order. Each "child" resources that is part of the composite can be assigned a specific weight. This weight is representative of the importance of this resource within the relationship.

The degradation factor is determined by applying the following formula. This formula (very similar to the availability formula) would be:

$$\text{degradation factor} = \frac{\sum_i (\text{child degradation factor} * \text{child weight})}{\sum_i \text{child weight}}$$

where i represents all child resources.

Redundant Relationships

A redundant relationship can be used to group two resources in a master/standby type of relationship. When an outage would occur on the master, the relationship would then take on the characteristics of the standby resource. In this case, the degradation factor of the parent resource could reflect the loss in throughput caused by the switch to the standby.

Hybrid Relationships

A hybrid relationship can be used to group disparate resources into a composite resource. Various hybrid types could be defined such as atomic-serial and atomic-parallel, serial-parallel, serial-serial, etc, etc . . .

For example, an atomic resource representing an ATM card can be grouped with a parallel composite resource that represents all of the ATM ports on that card. Certain performance attributes could be derived from the card object while other performance attributes could be derived from the collection of ports.

In the case of a hybrid relationship, the degradation factor would be equivalent to the degradation factor of a predetermined component. Using the example between an ATM card and its ports, the degradation factor of the parent resource could be configured to be equivalent to either that of the card or the set of ports.

Thus, instead of expressing the availability of a telecom network component as a function of its state, which does not work very well in cases where a component does not have a meaningful state, the invention permits the wellness of a component to be expressed in terms of a degradation factor. The degradation factor would be an attribute that would be expressed as a value between 0 and 1. A resource that is completely well would have its degradation factor set to 1. A resource that is completely down would have its degradation factor set to 0. Once this is done its availability can be calculated using its historical degradation factor values. The following calculation would be applied:

$$\text{Availability}(\text{period } p) = \frac{\sum_p (\text{degradation factor} * \text{duration})}{\text{period } p}$$

The invention permits the operator to perform performance management functions on these network components and gives the ability to handle vendor specific extension including node extensions and version extensions.

The invention will now be described in more detail, by way of example, only with reference to the accompanying drawings, in which.

Figure 1:
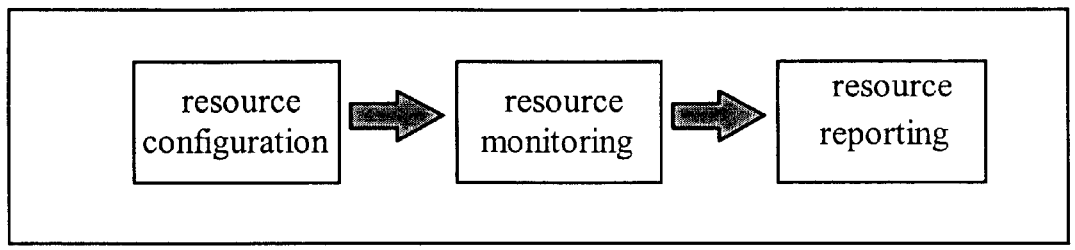
FIG. 1 is a block diagram showing the major functions performed on a resource.

In a digital communications network, a resource is something of value on which performance management functions performed. An analogous term is an asset. Examples of a service resource include customers, contracts and services. Examples of a network resource include networks, nodes, cards, ports and circuits.

It is important to be able to make the distinction between a resource and a service. VPNs, PVCs and SAPs are examples of network resources. A service may or may not be based on a network resource. A service has associated contractual information, support options, pricing information etc.; a network resource does not.

In a network management system, a resource profile is created for each new type of resource added to the system.

Example resource types include ATM PVC, IP port, FR node and TDM path.

A fundamental aspect of a resource type is that it should present a consistent abstraction regardless of its implementation. The resource profile defines the abstraction (or interface) for a particular type. This allows resources of the same type to be treated as equivalent and interchangeable resources regardless of how they are implemented. This in turn enables consistent calculations and "apples to apples" comparisons.

The profile of a resource type is defined and expressed as a set of attributes. All relevant information concerning a resource can be stored as attributes. Attributes can be defined for configuration information (includes state), statistical information and summarized (or derived) information.

For example, a resource profile can be created for an ATM port. It is determined that the interesting characteristics of an ATM port are its MTBF, MTTR and Monthly egress traffic. Each one of these characteristics can be expressed as an attribute of the ATM port.

It should be possible to specify the profile of a specific resource type using an interface language such as GDMO or Corba IDL.

The following attributes can apply to all resources in a generic fashion.

The degradation factor is an attribute that would be expressed as a value between 0 and 1. A resource that is completely well would have its degradation factor set to 1. A resource that is completely down would have its degradation factor set to 0.

Operational availability for a specific resource can then be determined using its historical degradation factor values. The following calculation would be applied.

$$\text{Availability}(\text{period } p) = \frac{\sum_p (\text{degradation factor} * \text{duration})}{\text{period } p}$$

The administrative state of a resource should be controllable from within the management system. In some cases, it may be imported from an external system. Different ways we can control the admin state include:

For resources, tied to services, tying the in service date and expiry date to the admin state of the resource.

The calendar function could modify the administrative state.

Within a specific resolve installation, the resolve registry keeps track of which profiles are supported by the specific installation.

The major functions performed on resources are summarized in FIG. 1.

These functions are defined in the following manner.
Resource configuration deals with:
the population of resource information through varied interface mechanism such as GUI, flat file, Corba.
the establishment of associations between resources.
Resource monitoring deals with:
the collection, manipulation and storage of data related to configured resources.
identification and notification of threshold violations.
Resource reporting deals with the presentation of information related to resources.

Figure 2:
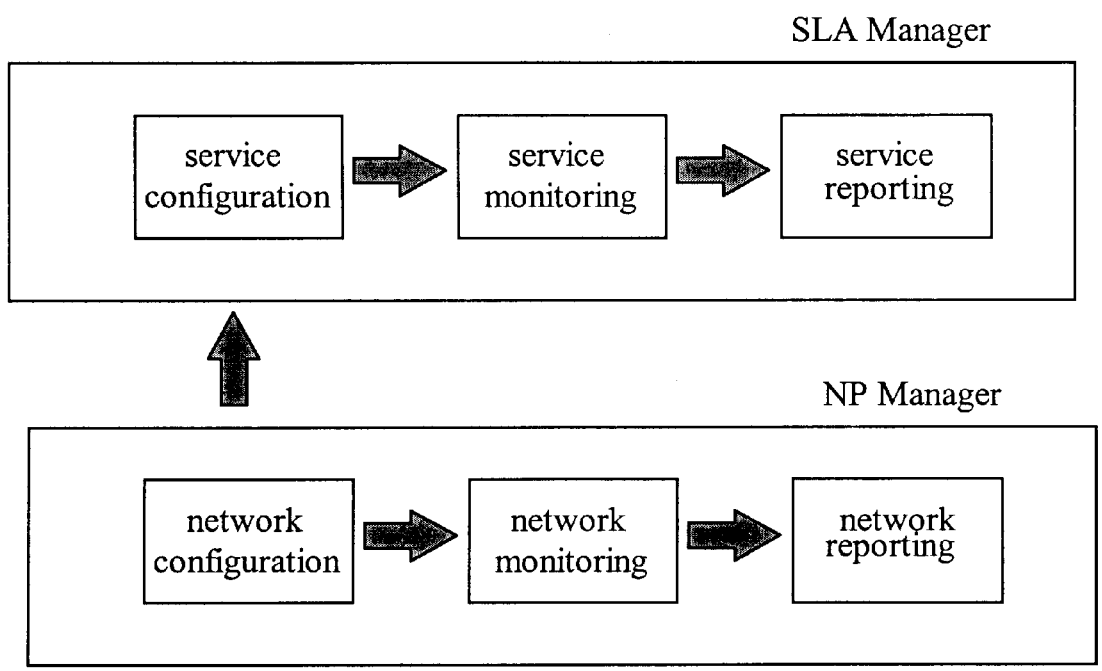
FIG. 2 is a block diagram illustratating how these Base capabilities can be extended by applications; namely service and network management applications.

FIG. 2 illustrates how these Base capabilities can be extended by applications; namely service and network management applications.

Examples of resources that can be managed by the SLA Manager application include customers, contracts, services, trouble tickets and service orders.

In this case, service configuration deals with:
population of service resources through varied interface mechanism such as GUI, flat file, Corba.
the associations between service resources such as customers, contracts and services.
the association between services and network resources.
Service monitoring deals with:
the collection, manipulation and storage of data related to service resources. Example information that could be collected include trouble reports and service orders.
identification and notification of service level threshold violations. In cases where a service is based on a network resource, a service level threshold can be defined to monitor the performance of the network resource itself.

Examples of resources that could be managed by the NP Manager application include networks, nodes, cards, ports and circuits.

In this case, network configuration deals with:
population of network resources through varied interface mechanism such as GUI, flat file or Corba.
the associations between network resources.
Network monitoring deals with:
the collection, manipulation and storage of data related to configured network resources. Example information includes statistics and event based information.
identification and notification of network level threshold violations.

Service and Network Reporting deal with the presentation of information at the network and service levels.

In practice, it is not possible to have service management without some form of network management to support it. Given the precedent already set, a service provider who strictly buys an SLA Manager would have the ability to do service management on very basic network resources. The service provider would then buy an NP Manager to allow him to define more complex network resources. These resources could then be monitored from a service perspective using his service management application. The service management application would not care where the network resource came from. All it would want to know are things like its availability, throughput, etc . . .

From a usability point of view, the configuration of network resources is a separate activity from service configuration. One can envision network operations personnel configuring, monitoring and reporting on network resources, while in the mean time, customer service personnel configuring, monitoring and reporting on services.

Given this line of thought, the Serial PVC feature should be treated as a feature of NP Manager.

Resource configuration deals with how a specific resource type is implemented. The resource configuration specifies how each attribute specified in the resource profile is populated.

The resource profile is the specification. The resource configuration is the implementation. Multiple implementations can exist for a particular specification within the same Resolve installation.

Different resource configurations can be built to handle the various vendor specific anomalies.

As an example, the information for a frame relay card could be imported directly from an external system. Conversely, if the information required for the frame relay card is unavailable, it may be possible to derive it from the appropriate collection of frame relay ports.

This separation of specification from implementation allows support for both configurations within a specific installation and treats them as equivalent, interchangeable resources.

The resource configuration can be identified using a sub type. Given a resource type of FR PVC, the sub type could be 46020 FR PVC.

Two basic types of configuration need to be supported by the Base. These are atomic and composite configurations.

ATOMIC CONFIGURATIONS

The information for resources with atomic configurations is imported from an external source through some interface. Information collected includes configuration information, state information and performance statistics. (A state can be considered an aspect of a resource's configuration) Other interesting information can be derived from the collected information and stored into derived attributes. As an example, daily summaries can be derived from hourly statistics values.

The degradation factor for an atomic resource can be derived from its operational state. An operational state of DISABLED would map to a degradation factor of 0.

COMPOSITE CONFIGURATIONS

All configuration, state and performance information for resources with composite configurations is derived from information provided by child resources. In order to accomplish this, two things are required:

the implementation must understand the relationship between child resources.

the implementation requires a configuration mechanism.

Examples of relationships include serial, parallel and redundant relationships. It should be possible to add new types of composite configurations to the Base that support new types of relationships as required.

Examples of different configuration mechanisms include Rule based and GUI based. An example of rule based configuration would be the following for an ATM node resource that is composed of ATM cards. The configuration mechanism would monitor the node id attribute of each ATM card event in order to determine which ATM node is affected. With a GUI based configuration mechanism, a person would select the individual child resources that make up the parent resource using a graphical user interface.

Using these relationships, we are capable of representing very complex resources. The following examples are used to demonstrate the flexibility of this approach.

Figure 3:
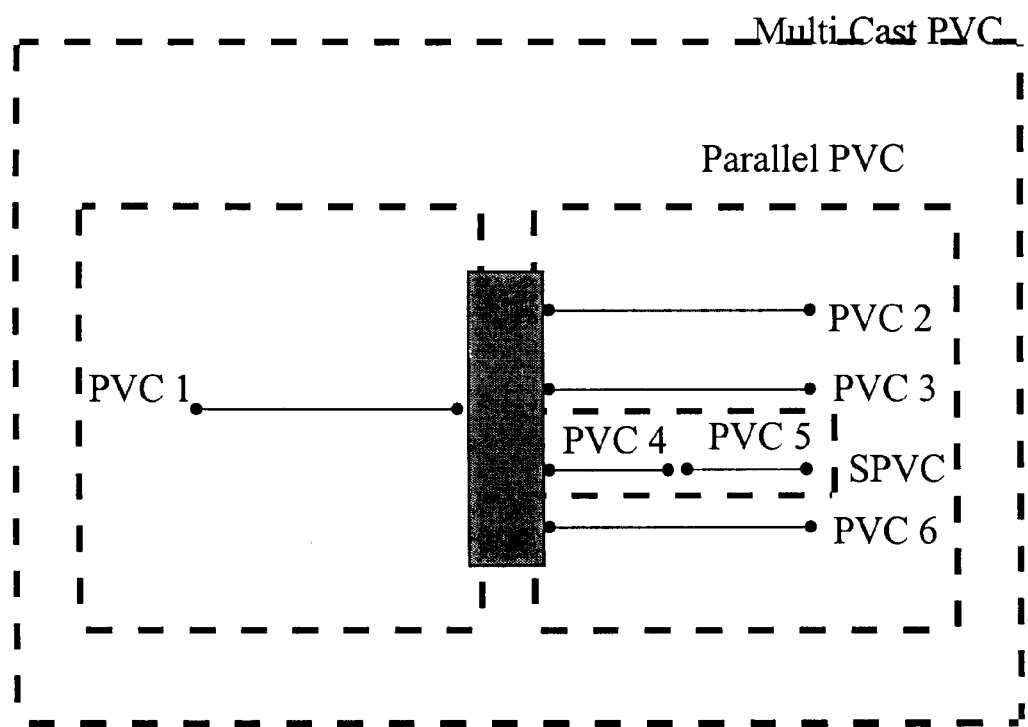
FIG. 3 is a diagram showing how resource types can be expressed.

- A serial PVC as supported in Cornerstone can be expressed as a bunch of PVC in a serial relationship.
- An ATM port can be expressed as a set of VPI/VCI combinations in a parallel relationship.
- A VPN can be expressed as a set of UNI's in a parallel relationship.
- More sophisticated types such as a multi cast PVC can also be expressed. FIG. 3 shows how this can be expressed.
- In this case, we have:
  - a composite resource entitled SPVC. PVCs 4 and 5 are child resources of this SPVC and are in a serial relationship. If modeled correctly, the serial PVC should have the same abstraction as a regular PVC and thus can be used interchangeably.
  - A parallel PVC is then created from the SPVC and PVCs 2,3 and 6.
  - The multi cast pvc is expressed as a serial relationship between a PVC and a parallel PVC.

RESOURCE RELATIONSHIPS

The following discussion defines the different relationships that can be supported within a resource configuration along with the characteristics of such relationships.

SERIAL RELATIONSHIPS

The "child" resources contained within a serial composite resource must always be specified in a specific order.

The degradation factor of the serial resource is always equivalent to the lowest degradation factor from its child resources. This can be represented by the following:

degradation factor=min (select all degradation factors from child resources)

Performance statistics and configuration attributes of the composite resource are determined by selecting the required attribute from the appropriate child resource. As an example, for a serial PVC, the Z side egress byte count would be equivalent to the Z side egress count value of the last "child" PVC. The CIR of a FR SPVC would be equivalent to the minimum CIR value of all the SPVCs in the list. cl PARALLEL RELATIONSHIPS The "child" resources within a parallel composite resource are not specified in any specific order. Each "child" resources that is part of the composite can be assigned a specific weight. This weight is representative of the importance of this resource within the relationship.

The degradation factor is determined by applying the following formula. This formula (very similar to the availability formula) would be:

$$\text{degradation factor} = \frac{\sum_i (\text{child degradation factor} * \text{child weight})}{\sum_i \text{child weight}}$$

where i represents all child resources

The performance statistics of a parallel composite resource is derived by applying a function (usually a SUM) on all of the child resources in the relationship. As an example, the egress byte value. of an ATM card would be equivalent to the SUM of all ATM Port egress transmit byte counts. The allocated bandwidth on the card would also be a sum of the allocated bandwidth of each ATM port.

REDUNDANT RELATIONSHIPS

A redundant relationship can be used to group two resources in a master/standby type of relationship. When an outage would occur on the master, the relationship would then take on the characteristics of the standby resource. In this case, the degradation factor of the parent resource could reflect the loss in throughput caused by the switch to the standby.

HYBRID RELATIONSHIPS

A hybrid relationship can be used to group disparate resources into a composite resource. Various hybrid types could be defined such as atomic-serial and atomic-parallel, serial-parallel, serial-serial, etc, etc . . .

As an example, an atomic resource representing an ATM card could be grouped with a parallel composite resource that represents all of the ATM ports on that card. Certain performance attributes could be derived from the card object while other performance attributes could be derived from the collection of ports.

In the case of a hybrid relationship, the degradation factor would be equivalent to the degradation factor of a predetermined component. Using the example between an ATM card and its ports, the degradation factor of the parent resource could be configured to be equivalent to either that of the card or the set of ports.

The invention offers the ability to express, model and quickly implement varied types of network components in order to support:

network concepts such as networks, nodes, cards and ports for the NPM application more sophisticated services based on network concepts such as SPVC, MultiCast PVC and VPNs.

The Embodiments of the invention in which an exclusive property or privilege is claimed are defined as follows:

1. A method of determining the availability of a network resource in a digital communications network, comprising the steps of identifying atomic resources that are not composed of other resources, assigning a degradation factor to each atomic resource, and subsequently deriving a degradation factor for a composite resource from the degradation factors of the atomic resources in accordance with a predetermined relationship.

2. A method as claimed in claim 1, wherein said degradation factor is a real number between zero and one inclusive.

3. A method as claimed in claim 2, wherein for a serial resource the degradation factor of a composite resource is equivalent to the lowest degradation factor of its child resources.

4. A method as claimed in claim 2, wherein for a parallel resource the degradation factor of a composite resource is given by the relationship $$\text{degradation factor} = \frac{\sum_i (\text{child degradation factor} * \text{child weight})}{\sum_i \text{child weight}}.$$

* * * * *